United States Patent
Nakano et al.

(10) Patent No.: US 6,921,790 B2
(45) Date of Patent: Jul. 26, 2005

(54) RESIN COMPOSITION AND METHOD FOR PRODUCING THE SAME

(75) Inventors: Kenji Nakano, Kurashiki (JP); Naohiko Uchiumi, Okayama (JP); Kaoru Ikeda, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 10/895,819

(22) Filed: Jul. 22, 2004

(65) Prior Publication Data

US 2005/0032955 A1 Feb. 10, 2005

(30) Foreign Application Priority Data

Aug. 7, 2003 (JP) ........................................ 2003-288396

(51) Int. Cl.⁷ .............................................. C08L 29/04
(52) U.S. Cl. ...................... 524/503; 524/557; 524/612; 524/779; 524/787
(58) Field of Search ................................. 524/503, 557, 524/612, 779, 787

(56) References Cited

U.S. PATENT DOCUMENTS

| | | |
|---|---|---|
| 5,302,417 A | 4/1994 | Yamauchi et al. |
| 6,174,949 B1 | 1/2001 | Ninomiya et al. |

FOREIGN PATENT DOCUMENTS

| | | | |
|---|---|---|---|
| EP | 0 990 513 | | 4/2000 |
| EP | 1 090 953 | * | 4/2001 |
| WO | WO 03/068847 | | 8/2003 |

OTHER PUBLICATIONS

U.S. Appl. No. 10/503,723, filed Aug. 6, 2003, Ikeda et al.
U.S. Appl. No. 10/700,499, filed Nov. 5, 2003, Tai et al.
U.S. Appl. No. 10/896,091, filed Jul. 22, 2004, Uchiumi et al.
U.S. Appl. No. 10/895,832, filed Jul. 22, 2004, Shindome et al.
U.S. Appl. No. 10/895,819, filed Jul. 22, 2004, Nakano et al.

* cited by examiner

*Primary Examiner*—William K. Cheung
(74) *Attorney, Agent, or Firm*—Oblon, Spivak, McClelland, Maier & Neustadt, P.C.

(57) ABSTRACT

The present invention is directed to a resin composition superior in barrier properties and also superior in flexibility, secondary processability and interlayer adhesiveness. The present invention is also directed to an environmentally friendly method for producing a resin composition, the method releasing no carboxylic acid such as acetic acid to the peripheral environment. The invention provides an EVOH resin composition (F) which has a content of an alkali metal salt (A), in terms of the alkali metal, of 0.1 to 20 $\mu$mol/g and a content of a carboxyl acid or its salt (C), in terms of carboxylate radical, of 2 $\mu$mol/g or less and which has an ethylene content of 5 to 60 mol % and a saponification degree of from 80 to 99 mol %. In addition, the invention provides a resin composition comprising the EVOH resin composition (F) and an EVOH having an ethylene content of 5 to 60 mol % and a degree of saponification of 99.2 to 100 mol %.

14 Claims, No Drawings

RESIN COMPOSITION AND METHOD FOR PRODUCING THE SAME

BACKGROUND OF THE INVENTION

1. Field of the Invention

The present invention relates to an ethylene-vinyl alcohol copolymer resin composition and more particularly relates to an ethylene-vinyl alcohol copolymer resin composition having a degree of saponification of 80–99 mol %. In addition, it relates to a resin composition comprising the resin composition and another thermoplastic resin. Moreover, it relates to a method for producing those resin compositions and their applications.

2. Description of the Related Art

An ethylene-vinyl alcohol copolymer, which may henceforth be abbreviated as EVOH, is a useful macromolecular material superior in oxygen barrier property, oil resistance, antistatic property and mechanical strength and is in wide use as various types of packaging material such as films, sheets and containers. Although EVOH pellets are molded into various molded articles by various methods, they are often melt-molded by, for example, extrusion molding or injection molding. However, in general, when molding an EVOH resin, it is necessary to set the melting temperature to be 200° C. or higher. Therefore, EVOH containing no additives is liable to deteriorate when being melt molded and it accordingly may cause deterioration in product quality due to formation of fish eyes or hard spots in products. In addition, it is necessary to add some additives in order also to improve the interlayer adhesiveness when using it with other resins while laminating them.

In a pamphlet of WO 99/05213 (U.S. Pat. No. 6,174,949), disclosed is an EVOH resin composition comprising a boron compound as an indispensable ingredient, acetic acid as an optional component, and at least one compound as an indispensable component selected among acetic acid salts and phosphoric acid compounds, the content of each component based on 100 parts by weight of EVOH being 0.001 to 1 part by weight in terms of boron for the boron compound, 0 to 0.05 part by weight for acetic acid, 0.001 to 0.05 part by weight in terms of metal for the acetic acid salt, and 0.0005 to 0.05 part by weight in terms of phosphate radical for the phosphoric acid compound. This resin composition is reported to be an EVOH resin composition having been improved in long-run workability, appearance and interlayer adhesiveness. The publication discloses that the purpose of the incorporation of the acetic acid salt is to improve the long-run workability or the interlayer adhesiveness.

JP-A-164059/2001 (EP-A-1090953) discloses an EVOH resin composition which is characterized in that, when it is heated to melt, its MFR shows specific behavior and that it contains from 50 to 500 ppm of carboxylic acid having a molecular weight of less than 75, from 50 to 500 ppm, in terms of metal element, of an alkali metal salt, from 10 to 120 ppm, in terms of metal element, of an alkaline earth metal salt, from 10 to 200 ppm, in terms of phosphate radical, of a phosphoric acid compound and from 50 to 2000 ppm, in terms of boron element, of a boron compound. This resin composition is reported to be an EVOH resin composition which is superior in appearance and in long-run workability at the time of its melt molding, less suffers yellowing when being recovered, and shows a superior interlayer adhesiveness when being fabricated into a laminate. In this invention, the alkali metal salt and the boron compound are added for improving the interlayer adhesiveness and for improving the long-run workability, respectively.

As a typical method for producing pellets of EVOH containing the additives, a method in which hydrous EVOH pellets are contacted with an aqueous solution containing the additives is disclosed. According to this method, it is easy to control the amounts of minor components contained in the EVOH pellets through an adjustment of the solution concentration and, therefore, it is possible to obtain pellets of stable quality by contacting them with the aqueous solution and then drying.

As mentioned above, the addition of an alkali metal salt to an EVOH resin in order to improve the interlayer adhesiveness has been done conventionally. The alkali metal salt is added typically in the form of an acetate. In many cases, acetic acid, which is not in the form of a salt, is also added simultaneously. Such an EVOH resin composition containing an acetate radical, however, may emit an acetic acid smell. One of the main applications of EVOH resin compositions is food packaging containers. In the market, EVOH resin compositions emitting smell as less as possible have been sought. In addition, EVOH resin compositions having a more improved melt stability and a superior long-run workability have been awaited.

On the other hand, in many cases where EVOH resin composition pellets are produced by contacting hydrous EVOH pellets with an aqueous solution containing acetic acid or its salt, acetic acid is released to the atmosphere when the hydrous pellets resulting from the contact are dried. Therefore, the surrounding environment and the working environment may be adversely affected.

An EVOH having a low degree of saponification is superior in flexibility to a normal EVOH, which is high in degree of saponification. It therefore is employed for applications where much importance is attached to the flexibility than the gas barrier property. Especially, a resin composition resulting from incorporation of an EVOH having a low degree of saponification into an EVOH having a high degree of saponification is in wide use as a resin composition having good transparency and good secondary processability for thermoformed containers and so on. In the production of such a resin composition comprising an EVOH having a low degree of saponification, additives have been incorporated by the method mentioned above. Therefore, the problems with the above-mentioned conventional production methods have been left unsolved.

SUMMARY OF THE INVENTION

The present invention was created for solving the above-mentioned problems. An object of the present invention is to provide an EVOH resin composition which is superior in flexibility, secondary processability and interlayer adhesiveness or a resin composition comprising the EVOH resin composition and another thermoplastic resin. Another object is to provide an environmentally friendly method for producing a resin composition, the method releasing no carboxylic acid such as acetic acid to the peripheral environment.

The above-mentioned objects can be achieved by providing an ethylene-vinyl alcohol copolymer resin composition (F) which has a content of an alkali metal salt (A), in terms of the alkali metal, of 0.1 to 20 $\mu$mol/g and a content of a carboxyl acid or its salt (C), in terms of carboxylate radical, of 2 $\mu$mol/g or less and which has an ethylene content of 5 to 60 mol % and a saponification degree of from 80 to 99 mol %. It is preferable that the ethylene content be 47 to 60 mol %. It is also preferable that the alkali metal salt (A) be a potassium salt. In addition, it is also preferable that the content of an alkaline earth metal salt (E) be 0.25 μmol/g or less in terms of alkaline earth metal. Preferred embodiments include molded articles comprising the ethylene-vinyl alcohol copolymer resin composition (F), especially, a film, a blow molded container and a thermoformed container. Another preferable embodiment is a multilayer structure which contains at least one layer comprising the ethylene-vinyl alcohol copolymer resin composition (F).

The above-mentioned objects can also be achieved by providing a resin composition comprising: 1 to 99% by weight of an ethylene-vinyl alcohol copolymer resin composition (F) having a content of an alkali metal salt (A), in terms of the alkali metal, of 0.1 to 20 μmol/g and a content of a carboxyl acid or its salt (C), in terms of carboxylate radical, of 2 μmol/g or less and also having an ethylene content of 5 to 60 mol % and a saponification degree of from 80 to 99 mol %, and 1 to 99% by weight of another thermoplastic resin (G). It is preferable that the thermoplastic resin (G) be an ethylene-vinyl alcohol copolymer having an ethylene content of 5 to 60 mol % and a degree of saponification of 99.2 to 100 mol %. Preferred embodiments include a molded article comprising the above-mentioned resin composition, especially, a film, a blow molded container and a thermoformed container. A multilayer structure which contains at least one layer comprising the above-mentioned resin composition is also a preferred embodiment.

The above-mentioned objects can also be achieved by providing a method for producing an ethylene-vinyl alcohol copolymer resin composition (F), wherein an ethylene-vinyl alcohol copolymer resin having an ethylene content of 5 to 60 mol % and a degree of saponification of 80 to 99 mol % is contacted with an aqueous solution containing an alkali metal salt (A) and carbon dioxide gas. It is preferable that the ethylene content be 47 to 60 mol %. Preferred embodiments include a method for producing a molded article, especially a film, a blow molded container and a thermoformed container, by melt molding the ethylene-vinyl alcohol copolymer resin composition (F). Another preferred embodiment is a method for producing a multilayer structure, wherein the aforementioned ethylene-vinyl alcohol copolymer resin composition (F) is laminated with a thermoplastic resin.

Moreover, the above-mentioned objects can also be achieved by providing a method for producing a resin composition, wherein an ethylene-vinyl alcohol copolymer resin having an ethylene content of 5 to 60 mol % and a degree of saponification of 80 to 99 mol % is contacted with an aqueous solution containing an alkali metal salt (A) and carbon dioxide gas and then is melt kneaded with another thermoplastic resin (G). It is preferable that the thermoplastic resin (G) be an ethylene-vinyl alcohol copolymer having an ethylene content of 5 to 60 mol % and a degree of saponification of 99.2 to 100 mol %. Preferred embodiments include a method for producing a molded article, especially a film, a blow molded container and a thermo formed container, by melt molding the above-mentioned resin composition. Another preferred embodiment is a method for producing a multilayer structure, wherein the above-mentioned resin composition is laminated with a thermoplastic resin.

The resin composition of the present invention is superior in barrier properties and also superior in flexibility, secondary processability and interlayer adhesiveness. The method for producing a resin composition of the present invention is an environmentally friendly method which releases no carboxylic acid such as acetic acid to the peripheral environment.

DESCRIPTION OF THE PREFERRED EMBODIMENTS

First, the method for producing the EVOH resin composition (F) of the present invention will be described. A preferred production method is a method in which an ethylene-vinyl alcohol copolymer resin is contacted with an aqueous solution containing an alkali metal salt (A) and carbon dioxide gas.

To make an EVOH resin contain an additive such as an alkali metal salt (A), conventionally employed is a method in which an EVOH is contacted with an aqueous solution containing these additives. The EVOH resin composition (F) of the present invention is characterized in that an EVOH is contacted with an aqueous solution containing carbon dioxide gas as well as the additives.

In order to improve the interlayer adhesiveness in a multilayer structure containing an EVOH resin composition (F) layer, it is desirable that the EVOH resin composition (F) contain an alkali metal salt (A). Therefore, an EVOH resin is, in many cases, immersed in an aqueous solution containing the alkali metal salt (A), especially an acetic acid salt of alkali metal. If, however, the solution used for the immersion is alkaline, the stability at the time of melt molding often deteriorates. For eliminating this problem, an acid, especially a carboxylic acid typified by acetic acid, is further added in many cases.

However, if the content of carboxylate radical derived from carboxylic acid or its salt is large, a resulting EVOH resin composition will often generate a carboxylic acid odor and may cause problems when being used for a food packaging application. In addition, there also is a problem in that a carboxylic acid is released during the drying conducted after the immersion in the aqueous solution containing the additives. A method therefore has been awaited in which the alkali metal salt (A) is contained and a content of a carboxylate radical is minimized but an aqueous solution containing additives is not made alkaline. The EVOH resin composition (F) of the present invention can solve this problem by making the aqueous solution containing the alkali metal salt (A) contain carbon dioxide gas instead using acetic acid.

The EVOH for use in the EVOH resin composition (F) of the present invention is preferably one obtained by saponifying an ethylene-vinyl ester copolymer. Particularly preferred is one obtained by saponifying an ethylene-vinyl acetate copolymer. The ethylene content is from 5 to 60 mol %; this allows molded articles superior in gas barrier properties and melt moldabilitio to be obtained. If the ethylene content is less than 5 mol %, the flexiblity will become insufficient and also the melt moldability will become poor. If it exceeds 60 mol %, the gas barrier properties will become insufficient. The lower limit of the ethylene content is preferably 20 mol % or more, and more preferably 40 mol % or more. Moreover, for example, in the case of being used for applications where a high secondary processability is required such as deeply-drawn containers, it is particularly preferable that the ethylene content of EVOH be 47 to 60 mol %. If the ethylene content is less than 47 mol %, the flexibility may become insufficient and therefore the deep drawability may get worse. On the other hand, the upper limit of the ethylene content is preferably 55 mol % or less.

The degree of saponification of the vinyl acetate moieties in the EVOH used in the EVOH resin composition (F) of the present invention is 80 to 99 mol %. In order to make a resin composition which has good gas barrier properties and also which is superior in secondary processability such as thermoformability, it is preferable that the degree of saponification of EVOH be 80 to 99 mol %. If the degree of saponification is less than 80 mol %, gas barrier properties become poor and thermostability in the course of melt molding tends to get worse extremely. If the degree of saponification exceeds 99.0 mol %, the flexibility tends to deteriorate and, therefore, an EVOH layer becomes subject to cracks, pinholes and local variation in thickness especially in applications where high secondary processability is required such as deeply-drawn containers. The degree of saponification is more preferably 90 mol % or more, and still more preferably 95 mol % or more. On the other hand, the degree of saponification is more preferably 98 mol % or less.

During the copolymerization of ethylene and vinyl acetate, other vinyl esters of fatty acids (e.g., vinyl propionate, vinyl pivalate, etc.) may be used together. The EVOH may contain from 0.0002 to 0.2 mol % of a vinylsilane compound as a comonomer. The vinylsilane compounds include, for example, vinyltrimethoxysilane, vinyltriethoxysilane, vinyltri(β-methoxy-ethoxy)silane and γ-methacryloxypropylmethoxysilane. Of these, vinyltrimethoxysilane and vinyltriethoxysilane are suitably employed.

The method of producing the EVOH for use in the invention is described concretely. The polymerization of ethylene and vinyl acetate is not restricted to solution polymerization and may be any of solution polymerization, suspension polymerization, emulsion polymerization and bulk polymerization. These may be conducted either in continuous mode and in batch mode. The polymerization conditions used in solution polymerization are as follows.

Solvent: Alcohols are preferred, but any other organic solvents (e.g., dimethylsulfoxide) capable of dissolving ethylene, vinyl acetate and ethylene-vinyl acetate copolymers may also be used. Alcohols usable herein include methyl alcohol, ethyl alcohol, propyl alcohol, n-butyl alcohol and t-butyl alcohol. Especially preferred is methyl alcohol.

Catalyst: Usable are azonitrile-type initiators such as 2,2-azobisisobutyronitrile, 2,2-azobis-(2,4-dimethylvaleronitrile), 2,2-azobis-(4-methyl-2,4-dimethylvaleronitrile), 2,2-azobis-(4-methoxy-2,4-dimethylvaleronitrile), and 2,2-azobis-(2-cyclopropylpropionitrile); organic peroxide-type initiators such as isobutyryl peroxide, cumyl peroxyneodecanoate, diisopropyl peroxycarbonate, di-n-propyl peroxydicarbonate, t-butyl peroxyneodecanoate, lauroyl peroxide, benzoyl peroxide and t-butyl hydroperoxide.

Temperature: 20 to 90° C., preferably 40° C. to 70° C.

Time (average residence time in the case of continuous mode): 2 to 15 hours, preferably 3 to 11 hours.

Degree of polymerization: 10 to 90%, preferably 30 to 80% based on the vinyl ester fed into the reactor.

Resin content in the solution after polymerization: 5 to 85%, preferably 20 to 70%.

Ethylene content in copolymers: Preferably 5 to 60 mol %, more preferably 20 to 60 mol %, even most preferably 47 to 60 mol %.

In addition to ethylene and vinyl acetate, any other minor comonomers capable of copolymerizing with them may be present. The comonomers include, for example, α-olefins such as propylene, isobutylene, α-octene and α-dodecene; unsaturated acids such as acrylic acid, methacrylic acid, crotonic acid, maleic acid and itaconic acid, and their anhydrides, salts, or mono- or di-alkyl esters; nitrites such as acrylonitrile and methacrylonitrile; amides such as acrylamide and methacrylamide; olefinsulfonic acids such as ethylenesulfonic acid, allylsulfonic acid and methallylsulfonic acid, and their salts; alkyl vinyl ethers, vinyl ketones, N-vinylpyrrolidone, vinyl chloride and vinylidene chloride.

After the monomers have been polymerized for a predetermined period of time to give the intended copolymer having a predetermined degree of polymerization, a polymerization inhibitor may be added thereto, if desired. Then, the non-reacted ethylene gas is evaporated away, and the non-reacted vinyl acetate is purged away. To purge the non-reacted vinyl acetate from the ethylene-vinyl acetate copolymer solution after the removal of ethylene by evaporation, for example, the copolymer solution is continuously fed into a column filled with raschig rings at its higher part at a constant flow rate while a vapor of an organic solvent such as methanol or the like is jetted into the column at its lower part, whereby a mixed vapor of the organic solvent such as methanol or the like and the unreacted vinyl acetate is let out from the column through its top, and the copolymer solution from which the unreacted vinyl acetate has been removed is taken out of the column through its bottom.

An alkali catalyst is added to the copolymer solution from which the unreacted vinyl acetate has been removed, whereby the vinyl acetate moiety of the copolymer is saponified. For this, employable is any of continuous or batchwise saponification. The alkali catalyst includes, for example, sodium hydroxide, potassium hydroxide and alkali metal alcoholates. The solvent for use in the saponification is preferably methanol. The saponification conditions are, for example, as follows, but it is possible to adjust the degree of saponification through adjustment of the water content of the saponification reaction solution. In order to obtain an EVOH having a degree of saponification of 80 to 99 mol %, it is preferable to set the water content to 1000 to 20000 ppm.

Concentration of copolymer solution: 10 to 50%.

Reaction temperature: 30 to 150° C.

Amount of catalyst to be used: 0.005 to 0.6 equivalent (based on the vinyl acetate moiety).

Time (average residence time in the case of continuous mode): 10 minutes to 6 hours.

Generally, in continuous saponification, a catalyst may be used in an amount smaller than that in batchwise saponification because in continuous saponification the methyl acetate resulting from the saponification can be removed more efficiently. Continuous saponification needs to be carried out at higher temperatures for the purpose of preventing EVOH formed in the saponification from forming crystals. In continuous saponification, therefore, it is preferable to use a reaction temperature and an amount of catalyst of the ranges shown below. Also in this case, it is possible to adjust the degree of saponification through adjustment of the water content of the saponification reaction solution. In order to obtain an EVOH having a degree of saponification of 80 to 99 mol %, it is preferable to set the water content to 1000 to 20000 ppm.

Reaction temperature: 70 to 150° C.

Amount of catalyst to be used: 0.005 to 0.1 equivalent (based on the vinyl acetate moiety).

The degree of saponification after the saponification reaction is 80 to 99 mol %. The degree of saponification can be varied in any desired manner by controlling the conditions for saponification.

The method for producing EVOH pellets from an alcohol solution of the resulting EVOH after the saponification is not particularly limited. Preferably, hydrous pellets are obtained by forming a strand-like solid from an alcoholic solution of EVOH in a coagulation bath and then cutting the strand. Before the forming of the strand, the EVOH concentration may be made higher than that at the time of the saponification by concentrating the alcoholic solution or, alternatively, a solution of EVOH in a water/alcohol mixture or a hydrous composition of EVOH may be prepared through a replacement of part or the whole of methanol by water. Hydrous pellets are obtained by extruding the resulting solution or composition into water or into an aqueous alcohol solution containing a small amount of alcohol to form a strand-like solid and then cutting it. Alternatively, pellets can be produced by cutting the extrudate still in a flowing state without making it form a strand-like solid, and then solidifying it in the water.

The hydrous pellets obtained in the manner described above is porous. Therefore, it is easy to remove the saponification catalyst residue by washing with water. It is also easy to add additives to the pellets or to dry the pellets after the removal. Such hydrous pellets preferably have a water content of 10 to 80% by weight because it will result in a great operational advantage. The water content is more preferably 20% by weight or more, and still more preferably 30% by weight or more. It is more preferably 70% by weight or less.

The thus-obtained hydrous pellets usually contain a saponification catalyst residue, namely an alkali metal salt, e.g. sodium acetate, which will cause a yellowing problem or the like. Therefore, it is desirable to remove the alkali metal salt by washing. The content of an alkali metal salt in hydrous pellets before washing is in general approximately from 100 to 10000 $\mu$mol/g (per EVOH weight), in terms of alkali metal. The washing method is not particularly restricted, but washing with water is preferred. The water used as a washing liquid herein may be an aqueous solution of acid such as acetic acid in order to remove alkali metal ions efficiently. It is also desirable to reduce the content of the saponification catalyst residue efficiently by combining the washing with water and the washing with acid.

It is desirable to reduce the alkali metal content in hydrous pellets after the washing to 0 to 50 $\mu$mol/g (per EVOH weight), in terms of alkali metal. The upper limit of the alkali metal content is more preferably 40 $\mu$mol/g, more preferably 30 $\mu$mol/g, and particularly preferably 20 $\mu$mol/g. The saponification catalyst residue is generally contained in the form of an alkali metal salt of acetic acid. Therefore, making hydrous pellets after washing have a sufficiently reduced alkali metal content in advance makes it easy to obtain an EVOH composition having a reduced carboxylate radical content.

The method for washing the hydrous pellets is not particularly restricted. Any of a batchwise treatment vessel and a continuous treatment vessel may be employed. In particular, a method in which pellets are treated while being fed continuously in a column vessel is preferable from the viewpoint of productivity.

For the EVOH resin composition (F) of the present invention, suitably employed is a method for producing the EVOH resin composition (F) in which an EVOH resin is contacted with an aqueous solution containing an alkali metal salt (A) and carbon dioxide gas. In other words, the aqueous solution which an EVOH resin is contacted with is an aqueous solution containing an alkali metal salt (A) and carbon dioxide gas.

The amount of the carbon dioxide gas contained in the aqueous solution is not particularly limited and may be adjusted appropriately. However, it is necessary to dissolve carbon dioxide gas in an amount more than the amount in which carbon dioxide gas contained in the air dissolves spontaneously. The concentration of carbon dioxide gas (the sum of free carbon dioxide and carbonic acid) in the aqueous solution is preferably 0.5 mmol/L or more, more preferably 2 mmol/L or more, and still more preferably 10 mmol/L or more. In order to increase the solubility of carbon dioxide gas, the treatment may be conducted under elevated pressure approximately from 1.5 to 10 atm.

When adopting a method of treating pellets by feeding them continuously by use of a continuous treatment vessel, especially, a column vessel, a too high carbon dioxide gas concentration in the aqueous solution may result in formation of bubbles around EVOH pellets to have some adverse effect on the sedimentation property of resin. Therefore, when such a continuous treatment process is applied, it is preferable in some cases that the carbon dioxide gas concentration in an aqueous solution be lower than the saturated carbon dioxide gas concentration. In such cases, the carbon dioxide gas concentration is set at a value lower than the saturated carbon dioxide gas concentration. It preferably is set to be not higher than 0.95 times the saturated carbon dioxide gas concentration, and more preferably is set to be not higher than 0.9 times the saturated carbon dioxide gas concentration. The concentration is determined depending also on the temperature of a treatment solution and the pressure. On the other hand, when a batch treatment vessel is used, no sedimentation property problem usually arises. However, the upper limit of the carbon dioxide gas concentration may be set in the same manner as continuous treatment vessels.

In the interest of securing interlayer adhesiveness and long-run workability, it is preferable that the aqueous solution contain an alkali metal salt (A). A preferred range of the content of the alkali metal salt (A) is influenced by the water content of hydrous pellets. In general, however, it is preferably 0.05 to 40 mmol/L. A more preferable lower limit of the content of the alkali metal salt (A) in the aqueous solution is 0.1 mmol/L. A more preferable upper limit is 20 mmol/L. As described later, a desirable content of the alkali metal salt (A) in the EVOH resin composition (F) varies depending on the ethylene content of EVOH. It therefore is preferable to adjust the content of the alkali metal salt (A) in the aqueous solution in correspondence therewith.

The cation of the alkali metal salt (A) is not specifically defined. The salt is selected from lithium salts, sodium salts, potassium salts, rubidium salts and cesium salts. Among them, sodium salts and potassium salts are preferable. Potassium salts are particularly preferable. The use of a potassium salt can yield a resin composition superior in both interlayer adhesiveness and long-run workability.

The anion of the alkali metal salt (A) is not also specifically defined. The alkali metal salt can be added in the form of carbonate, hydrogencarbonate, phosphate, hydrogenphosphate, hydroxide, carboxylate or the like. Especially, it is preferable to add the salt in the form of carbonate, hydrogencarbonate, hydrogenphosphate or hydroxide. Moreover, it is also preferable to add the alkali metal salt in the form of borate. However, in light of the purpose of the present invention to reduce the content of carboxylate radicals, it is not preferable that the alkali metal salt be a carboxylate.

In order to inhibit the sticking of deposits near a dielip at the time of melt-molding, the aqueous solution may contain a boron compound (B). The concentration of the boron compound (B) in the aqueous solution is preferably 0.1 to 50 mmol/L in terms of boron element because this makes a dry resin composition pellets possible to contain an appropriate amount of boron compound (B). The lower limit of the concentration of the boron compound (B) is more preferably 0.5 mmol/L or more, and still more preferably 1 mmol/L or more. The upper limit thereof is more preferably 40 mmol/L or less, and still more preferably 30 mmol/L or less. If the concentration exceeds 50 mmol/L, the EVOH resin composition (F) is liable to gelation and the external appearance of molded articles may deteriorate.

Examples of the boron compound (B) for use in the preparation of the aqueous solution include, but are not limited to, boric acids, boric acid esters, boric acid salts and borohydrides. Specifically, the boric acids include orthoboric acid, metaboric acid and tetraboric acid; the boric acid esters include triethyl borate and trimethyl borate; and the boric acid salts include alkali metal salts and alkaline earth salts of boric acids such as those mentioned above and borax. Among these compounds, preferred is orthoboric acid, which henceforth is sometimes referred simply as boric acid.

In view of the object of the present invention, it is desirable that the aqueous solution contain no carboxylic acid or its salt (C). It, however, should be noted that this does not exclude a case where a carboxylic acid or its salt (C) remaining in the EVOH resin is eluted into the aqueous solution to be contained therein. Moreover, a case where the aqueous solution contains a carboxylic acid or its salt (C) unless the effect of the present invention is adversely affected is not excluded as well.

In order to balance the long-run workability at the time of melt molding and the yellowing resistance, especially in high-temperature molding, and interlayer adhesiveness, it is desirable for the aqueous solution to contain a phosphoric acid compound (D). Containing the phosphoric acid compound (D) in an appropriate amount makes it possible to inhibit yellowing of molded articles and generation of gels and hard spots when melt-molding the resulting EVOH resin composition (F). When adding a phosphoric acid compound (D), the upper limit of the concentration of the phosphoric acid compound (D) in the aqueous solution, in terms of phosphate radical, is preferably 10 mmol/L, more preferably 5 mmol/L, still more preferably 3.5 mmol/L, and most preferably 2.5 mmol/L. On the other hand, when adding a phosphoric acid compound (D), the lower limit of the concentration of the phosphoric acid compound (D) in the aqueous solution, in terms of phosphate radical, is preferably 0.01 mmol/L, more preferably 0.03 mmol/L, still more preferably 0.05 mmol/L, and most preferably 0.1 mmol/L.

As the phosphoric acid compound (D) for use in the preparation of the aqueous solution, inorganic phosphoric acid compounds are preferably employed. Examples of such compounds include various acids, such as phosphoric acid and phosphorous acid, and their salts. Phosphoric acid salts may be contained in any form of primary phosphate, secondary phosphate and tertiary phosphate. The type of their cations are also particularly restricted, but alkali metal salts are preferred. In particular, addition of a phosphoric acid compound (D) in the form of sodium dihydrogenphosphate, potassium dihydrogenphosphate, disodiumhydrogenphosphate or dipotassium hydrogenphosphate is preferred.

The aqueous solution may contain an alkaline earth metal salt (E). However, it is inappropriate to add it in a large amount because alkaline earth metal salts easily form a slightly soluble carbonate. If the content of the alkaline earth metal salt (E) is large, the EVOH resin composition (F) may get yellowed in the course of melt molding. The alkaline earth metal salt (E) may optionally be added, but it is preferable not to add the salt positively. When the alkaline earth metal salt (E) is added, its concentration in the aqueous solution is within the range of 0 to 0.2 mmol/L, more preferably 0.1 mmol/L or less, and still more preferably 0.05 mmol/L or less, in terms of alkaline earth metal.

The type of the cation of the alkaline earth metal salt (E) is not particularly restricted. Examples of the salt include magnesium salts, calcium salts, barium salts and strontium salts. Magnesium salts and calcium salts are preferred. The type of the anion of the alkaline earth metal salt (E) is not also restricted particularly. The alkali metal salt can be added in the form of carbonate, hydrogencarbonate, phosphate, hydrogenphosphate, hydroxide, carboxylate or the like. Especially, it is preferable to add the salt in the form of carbonate, hydrogencarbonate, hydrogenphosphate or hydroxide. In general, many of the alkaline earth metal salts are hardly soluble in water, but their solubilities are increased by the presence of carbonate. However, in light of the purpose of the present invention to reduce the content of carboxylate radicals, it is not preferable that the alkali metal salt be a carboxylate.

The pH of the aqueous solution containing the additives and carbon dioxide gas is preferably 3.5 to 6.5. Making an aqueous solution contain at least a certain amount of carbon dioxide gas permits the aqueous solution to be as acidic as described above. The pH value is more preferably 3.8 or more and still more preferably 4 or more. The pH value is more preferably 6.3 or less, still more preferably 6.0 or less, and most preferably 5.8 or less.

The method for preparing the aqueous solution containing the additives and carbon dioxide gas is not particularly restricted. To the aqueous solution in which carbon dioxide gas has been dissolved in advance, an additive such as alkali metal salt (A) may be added. On the contrary, to an aqueous solution in which an additive such as alkali metal salt (A) has been dissolved in advance, carbon dioxide gas may be dissolved. Alternatively, the foregoing two types of aqueous solutions prepared in advance may be mixed.

The method for contacting EVOH resin with the aqueous solution is not particularly restricted, but a method in which the EVOH resin is immersed in the aqueous solution is desirable. The EVOH resin may have any shape during its immersion in the aqueous solution, such as powder, granule, sphere and circular cylinder pellet. For example, it is preferable to contact hydrous EVOH pellets prepared in the matter described previously with the aforementioned aqueous solution. To immerse the hydrous pellets in the aqueous solution permits the EVOH resin pellets to contain an additive such as the alkali metal salt (A) efficiently and homogeneously. The water content of the hydrous pellets before the immersion in the aqueous solution is preferably 10 to 80% by weight. The water content is more preferably 20% by weight or more, and still more preferably 30% by weight or more. In addition, it is more preferably 75% by weight or less, and still more preferably 70% by weight or less.

The temperature of the aqueous solution when it is contacted with EVOH resin is not particularly limited, but it is preferably 10 to 90° C. If the temperature is 10° C. or lower, it may take too much time to make the EVOH resin pellets to contain the additive such as the alkali metal salt (A) homogeneously. If it exceeds 90° C., the saturation solubility of carbon dioxide gas will decrease and it will be difficult to make the solution contain a sufficient amount of carbon dioxide gas in some cases. In addition, pellets may fuse and attach to each other. The temperature of the aqueous solution is more preferably 20° C. or higher, and still more preferably 30° C. or higher. In addition, it is more preferably 85° C. or lower, and still more preferably 80° C. or lower. When the contact is conducted at a temperature of 70° C. or higher, the solubility of carbonic acid becomes small and, therefore, it is preferable to conduct the contact under pressure almost at 1.5 to 10 atm.

The desirable range of the time for which EVOH resin is contacted with the aqueous solution varies depending on the form of the EVOH resin. For pellets having a size approximately ranging from 1 to 10 mm, the time is preferably 1 hour or longer, and still more preferably 2 hours or longer.

The method for contacting EVOH resin with the aqueous solution is not particularly restricted. It is permitted to contact the EVOH resin with water in advance and thereafter dissolve carbon dioxide gas or additives in water. However, a method in which an aqueous solution prepared in advance by dissolving those ingredients is contacted with the EVOH resin because an EVOH resin composition (F) with a stable quality which contains additives uniformly can be obtained.

Regarding the mode for contacting the EVOH resin with the aqueous solution, any of a batch mode and a continuous mode maybe adopted. In the continuous mode, a preferable examples is a method in which an EVOH resin is moved downward slowly in a column-type vessel and the resin is simultaneously contacted with an aqueous solution which is fed continuously.

It is also permitted to prepare two or more aqueous solutions and then carry out the contact in two or more times. For example, a method which comprises contacting first with an aqueous solution containing an additive such as an alkali metal salt (A) only and then contacting with an aqueous solution containing carbon dioxide gas in addition to the additive such as the alkali metal salt (A) may also be adopted.

Moreover, another adoptable method is one comprising contacting an EVOH resin with an aqueous solution containing carbon dioxide gas in addition to an additive such as an alkali metal salt (A) through immersion of the resin in the solution and then charging the resin to an extruder followed by contacting, in the extruder, the resin with an aqueous solution containing an alkali metal salt (A), a boron compound (B), a phosphoric acid compound (D) or an alkaline earth metal salt (E) and melt kneading the mixture.

EVOH resin, preferably EVOH resin pellets, is contacted with the aqueous solution first, then dewatered if necessary, and thereafter is subjected to a drying step. The drying method is not particularly restricted. A hot air dryer or the like may be employed. The EVOH resin may also be dried while being melt-kneaded in an extruder with a vent. As a dryer, either a fluidized dryer or a static dryer is available. Alternatively, these dryers may be used in combination. Preferred is a method comprising drying by the fluidized drying method first and subsequently drying by the static drying method. The drying temperature is not particularly limited, but a temperature from about 70 to 120° C. is generally employed. The temperature may be increased with the progress of the drying. The water content after the drying is generally 1% by weight or less, and preferably 0.5% by weight or less. Thus, dry pellets of the EVOH resin composition (F) are obtained.

In the above-described method for producing the EVOH resin composition (F), a resin composition containing almost no carboxylate radical can be obtained. Therefore, an environmentally friendly production method in which no carboxylic acid volatilizes in this drying step and no carboxylic acid is released to the surrounding can be provided.

The EVOH resin composition (F) to be preferably employed in the present invention is an EVOH resin composition (F) which has a content of an alkali metal salt (A), in terms of the alkali metal, of 0.1 to 20 $\mu$mol/g and a content of a carboxyl acid or its salt (C), in terms of carboxylate radical, of 2 $\mu$mol/g or less and which has an ethylene content of 5 to 60 mol % and a degree of saponification of from 80 to 99 mol %.

This EVOH resin composition (F) is an EVOH resin composition (F) which releases less odor and which is superior in long-run workability at the time of melt molding, flexibility and interlayer adhesiveness. The EVOH resin composition (F) is preferably a composition produced by the above-described production method, but it is not restricted to one produced by that method.

This EVOH resin composition (F) contains 0.1 to 20 $\mu$mol/g, in terms of alkali metal, of an alkali metal salt (A). Containing the alkali metal salt (A) improves the EVOH resin composition (F) itself in interlayer adhesiveness, and yellowing resistance and long-run workability at the time of melting. When the content is less than 0.1 $\mu$mol/g, the interlayer adhesiveness, both the yellowing resistance and the long-run workability at the time of melting are insufficient. If the content exceeds 20 $\mu$mol/g, the yellowing resistance at the time of melting will be poor. The lower limit of the content of the alkali metal salt (A) is more preferably 0.3 $\mu$mol/g or more, and still more preferably 0.5 $\mu$mol/g or more. The upper limit of the content of the alkali metal salt (A) is preferably 15 $\mu$mol/g or less, more preferably 10 $\mu$mol/g or less, and particularly preferably 8 $\mu$mol/g or less.

It is preferable that the content of the alkali metal salt (A) and the ethylene content of the EVOH satisfy the following formula (1):

$$0.95 \times exp(0.039 \times ET) - 2 \leq a \leq 0.95 \times exp(0.039 \times ET) + 2 \tag{1}$$

wherein a is the content ($\mu$mol/g) of the alkali metal salt (A) in terms of alkali metal and ET is the ethylene content (mol %) of the ethylene-vinyl alcohol copolymer.

When the content of the alkali metal salt (A) is larger beyond the range provided by formula (1) above, the hue of the EVOH resin composition (F) may get worse. On the other hand, when the content is less beyond the range provided by formula (1) above, the long-run workability and the adhesiveness may be reduced. The two contents more preferably satisfy the following formula (1') and still more preferably satisfy the following formula (1").

$$0.95 \times exp(0.039 \times ET) - 1.5 \leq a \leq 0.95 \times exp(0.039 \times ET) + 1.5 \tag{1'}$$

$$0.95 \times exp(0.039 \times ET) - 1 \leq a \leq 0.95 \times exp(0.039 \times ET) + 1 \tag{1"}$$

The EVOH resin composition (F) of the present invention has a content of carboxylic acid or its salt (C), in terms of carboxylate radicals, of 2 $\mu$mol/g or less. The content of carboxylic acid or its salt (C) used herein indicates the amount of carboxylate radicals extracted through an immersion treatment in water at 95° C. for 10 hours. Because most of the carboxylic acid and the salt thereof contained in an EVOH resin composition (F) are assumed to be extracted through the immersion treatment in water at 95° C. for 10 hours, the measured value indicates a value corresponding to the total content of them. In other words, the EVOH resin composition (F) is a resin composition having an extremely small content of a carboxylic acid and a salt thereof. The content of the carboxylate acid or its salt (C) is preferably 1.5 μmol/g or less, more preferably 1 μmol/g or less, and still more preferably 0.5 μmol/g or less.

The EVOH resin composition (F) to be employed in the present invention may further contain a boron compound (B). The effect of the incorporation of the boron compound (B) and the kind thereof are the same as those described in the description of the method for producing the EVOH resin composition (F). The content of the boron compound (B) is preferably 1 to 200 μmol/g in terms of boron element. It is more preferably 2 μmol/g or more, and still more preferably 3 μmol/g or more. On the other hand, it is more preferably 150 μmol/g or less, and still more preferably 100 μmol/g or less.

Moreover, it is preferable that the EVOH resin composition (F) contain a phosphoric acid compound (D) for balancing the long-run workability and yellowing resistance at the time of melt molding, especially the yellowing resistance in high-temperature molding, and the interlayer adhesiveness. The effect of the incorporation of the phosphoric acid compound (D) and the kind thereof are the same as those described in the description of the method for producing the EVOH resin composition (F). The upper limit of the content of the phosphoric acid compound (D) is preferably 5 μmol/g, more preferably 4 μmol/g, still more preferably 3 μmol/g, and most preferably 1.5 μmol/g or less. If too much phosphate radical is incorporated, the resin composition will lose thermal stability and as a result may get liable to gelation. On the other hand, the lower limit of the content of the phosphoric acid compound (D), in terms of phosphate radical, is preferably 0.05 μmol/g, more preferably 0.1 μmol/g, still more preferably 0.15 μmol/g, and most preferably 0.2 μmol/g.

In this situation, it is preferable that in the EVOH resin composition (F) the ratio (a/d) of the content (a: μmol/g) of the alkali metal salt (A) in terms of alkali metal to the content (d: μmol/g) of the phosphoric acid compound (D) in terms of phosphate radical be 2.4 to 50. This can result in a resin composition superior in hue and thermal stability at the time of melt molding. If the ratio (a/d) is less than 2.4, the resin composition will lose thermal stability and as a result may get liable to gelation. On the other hand, if the ratio (a/d) exceeds 50, the hue may get worse and, in some cases, the thermal stability will be adversely affected. The ratio (a/d) is more preferably not more than 40, and still more preferably not more than 30.

The EVOH resin composition (F) may contain an alkaline earth metal salt (E). However, for inhibition of yellowing at the time of melt molding, the content thereof in terms of alkaline earth metal is preferably 0.25 μmol/g or less. Particulars regarding the incorporation of the alkaline earth metal salt (E) are the same as those described in the description of the method for producing the EVOH resin composition (F). The content of the alkaline earth metal salt (E) is preferably not more than 0.25 μmol/g, and more preferably not more than 0.1 μmol/g in terms of alkaline earth metal. It is still more preferable that substantially no alkaline earth metal salt (E) be contained.

A desirable melt flow rate (MFR) (measured at 190° C. under a load of 2160 g; when a melting point is around 190° C. or more, the measurements are carried out under 2160 g load at two or more temperatures not lower than the melting point. The results are plotted, in a semilog graph, with reciprocals of absolute temperatures as abscissa against logarithms of MFRs as ordinate and the preferable MFR is represented by an extrapolation to 190° C.) of the EVOH resin composition (F) of the present invention is preferably 0.1 to 200 g/10 min. The lower limit of MFR is more preferably not lower than 0.2 g/10 min, still more preferably not lower than 0.5 g/10 min, and most preferably not lower than 1 g/10 min. The upper limit of MFR is more preferably 50 g/10 min or lower, still more preferably 30 g/10 min or lower, and most preferably 15 g/10 min or lower. The cases where the melt flow rate is low beyond these ranges are not preferred because the inside of an extruder during molding will be in a high torque condition and it will become difficult to melt kneading. The cases where the melt flow rate is high beyond those ranges are not preferred because the mechanical strength of molded articles obtained by molding the EVOH resin composition (F) will be insufficient.

The thus obtained EVOH resin composition (F) of the present invention is preferably molded after being blended with another resin though it may be molded alone. A preferred embodiment of the present invention is a resin composition comprising 1 to 99% by weight of the EVOH resin composition (F) and 1 to 99% by weight of another thermoplastic resin (G).

The thermoplastic resin (G) to be blended with the EVOH resin composition (F) may be selected appropriately depending on the application and is not particularly restricted. Examples thereof include polyolefin (e.g. polyethylene, polypropylene, poly-1-butene, poly-4-methyl-1-pentene, ethylene-propylene copolymer, copolymer of ethylene and α-olefin of 4 or more carbon atoms, copolymer of polyolefin and maleic anhydride, ethylene-vinyl acetate copolymer, ethylene-vinyl alcohol copolymer, ethylene-acrylic ester copolymer, and modified polyolefin obtained by graft modifying those polyolefins with unsaturated carboxylic acid or its derivative), various types of nylon (e.g. Nylon 6, Nylon 66 and Nylon 6/66 copolymer), polyvinyl chloride, polyvinylidene chloride, polyester, polystyrene, polyacrylonitrile, polyurethane, polyacetal and modified polyvinyl alcohol resin.

In applications where importance is attached to gas barrier properties, such as food packaging, it is preferable to use an ethylene-vinyl alcohol copolymer among them. In a particularly preferable embodiment, the thermoplastic resin (G) is an EVOH having an ethylene content of 5 to 60 mol % and a degree of saponification of 99.2 to 100 mol %. When incorporating such an EVOH having a high degree of saponification to the EVOH resin composition (F) of the present invention, it is possible to inhibit the reduction of transparency of EVOH while improving its flexibility and secondary processability.

When the degree of saponification of the EVOH used as the thermoplastic resin (G) is less than 99.2 mol %, the gas barrier properties or melt stability of a resulting resin composition may get worse. The degree of saponification is more preferably 99.5 mol % or more, and still more preferably 99.8 mol % or more. If the ethylene content of the EVOH to be used as the thermoplastic resin (G) is less than 5 mol %, the melt moldability may be worse. If the ethylene content exceeds 60 mol %, the gas barrier properties may be insufficient. The lower limit of the ethylene content is preferably 15 mol % or more, and more preferably 20 mol % or more. On the other hand, the upper limit of the ethylene content is preferably 55 mol % or less, and more preferably 50 mol % or less.

The resin composition of the present invention comprises 1 to 99% by weight of the EVOH resin composition (F) and 1 to 99% by weight of another thermoplastic resin (G). The incorporation proportions of the EVOH resin composition (F) and the thermoplastic resin (G) are adjusted depending on the purpose. The proportions are preferably 3 to 97% by weight for the EVOH resin composition (F) and 3 to 97% by weight for the thermoplastic resin (G).

When using an EVOH having an ethylene content of 5 to 60 mol % and a degree of saponification of 99.2 to 100 mol % as the thermoplastic resin (G), in order to improve the flexibility or secondary processability of an EVOH having a high degree of saponification while keeping its good gas barrier properties which the EVOH inherently has, it is preferable to use the EVOH having a high degree of saponification as a main component. In this case, in order to obtain good barrier properties, it is preferable that the content of the EVOH resin composition (F) be 50% by weight or less, and more preferably 30% by weight or less. On the other hand, in order to clarify the effect of improving flexibility or secondary processability, it is preferable that the content of the EVOH resin composition (F) be 5% by weight or more, and more preferably 10% by weight or more. In this situation, it is preferable that the remaining component be the aforementioned EVOH having a high degree of saponification.

To the resin composition of the present invention, various additives such as antioxidant, color agent, U absorber, slipping agent, antistatic agent, plasticizer, crosslinking agent such as boric acid, inorganic filler and inorganic desiccant, and various resin such as superabsorbent polymer may be incorporated unless the effect obtained by the present invention is adversely affected.

The blending method for obtaining a resin composition by melt kneading the EVOH resin composition (F), the thermoplastic resin (G) and, in some cases, the additive is not particularly restricted and any known method can be used. Particularly, in view of simplicity and necessary cost of a process, preferred are melt kneading methods using a single or twin screw extruder (corotating or counterrotating), an intensive mixer, or a continuous intensive mixer. Above all, generally used is a method in which the EVOH resin composition (F) and the thermoplastic resin (G) are dry blended, pelletized, for example, by a single or twin screw extruder, and dried. In order to make the dispersion state uniform, use of an extruder which can achieve a high degree of kneading during the kneading and pelletizing operations is preferred. The kneading temperature preferably ranges from 150 to 280° C. In order to prevent oxidization of a resulting resin composition, it is preferable that the hopper be sealed with nitrogen gas and that the extrusion be conducted at low temperature. A longer kneading time will lead to a better result, but a kneading time of from 0.1 to 20 minutes is preferable in view of prevention of oxidization of a resin composition and production efficiency.

The thus obtained resin composition of the present invention is molded through melt molding into various types of molded articles such as films, sheets, containers, pipes and fibers. As a method for melt molding, extrusion molding, inflation extrusion, blow molding, injection molding, melt spinning and the like can be used. The molding temperature, which varies along with the melting point of the copolymer, is preferably about 150 to about 270° C. In an available procedure, the resin composition of the present invention is pelletized and then subjected to molding. In another available procedure, the EVOH resin composition (F) and the thermoplastic resin (G) are dry blended and then subjected directly to molding. It is also possible for these molded articles to be pulverized for the purpose of reuse and then be molded again. In addition, it is also possible to subject a film, a sheet or fibers to secondary processing by conducting their uni- or biaxial stretching or thermoforming.

Molding methods will be described below. It should be noted that the resin composition of the present invention used herein encompasses both an EVOH resin composition (F) alone and a resin composition comprising an EVOH resin composition (F) and another thermoplastic resin (G).

The resin composition of the present invention may be used in the form of a molded article composed of a single layer only of the resin composition. However, it is also preferable to fabricate the resin composition into a multilayer structure including at least one layer comprising the resin composition because the resin composition exhibits a superior interlayer adhesiveness. The layer constitution of the multilayer structure may be, but is not limited to, X/T, T/X/T, X/Ad/T, T/Ad/X/Ad/T, T/Ad/X/T and T/Ad/T/Ad/X/T where the resin composition of the present invention, an adhesive resin and another thermoplastic resin are represented by X, Ad and T, respectively. Each of the layers shown above may be a single layer or, in some cases, may include multiple layers.

The method for producing the multilayer structure is not particularly restricted. Examples thereof include a method in which a thermoplastic resin is melt extruded on a molded article (film, sheet or the like) made of the resin composition of the present invention, a method in which the resin composition and another thermoplastic resin are coextruded on a substrate of a thermoplastic resin or the like, a method in which a thermoplastic resin and the resin composition of the present invention are coextruded or coinjected, and a method in which a molded article obtained from the resin composition of the present invention and a film or sheet made of another substrate are laminated together using a known adhesive such as organic titanium compound, an isocyanate compound, and a polyester compound. Among these, a method of coextrusion or coinjection is preferable.

The method for coextrusion molding the composition of the present invention and a thermoplastic resin is not particularly restricted and preferable examples thereof include the multimanifold-merging T die method, the feedblock-merging T die method and the inflation method. The method of coinjection is not also particularly restricted and conventional methods may be employed.

Examples of the thermoplastic resin to be employed for lamination with the resin composition of the present invention include homopolymers or copolymers of olefins such as linear low-density polyethylene, low-density polyethylene, medium-density polyethylene, high-density polyethylene, ethylene-vinyl acetate copolymers, ethylene-vinyl alcohol copolymers, ethylene-propylene copolymers, polypropylene, propylene-α-olefin copolymers (α-olefins having 4–20 carbon atoms), polybutene and polypentene, polyester such as polyethylene terephthalate, polyester elastomer, polyamide resin such as nylon-6 and nylon-6,6, polystyrene, polyvinyl chloride, polyvinylidene chloride, acrylic resin, vinyl ester resin, polyurethane elastomer, polycarbonate, chlorinated polyethylene and chlorinated polypropylene.

When the resin composition of the present invention and the thermoplastic resin are laminated, an adhesive resin may be used. As the adhesive resin for such a case is preferably an adhesive resin made of a carboxylic acid-modified polyolefin. By the carboxylic acid-modified polyolefin used herein is meant a modified olefin-based polymer containing carboxyl groups which is obtained by chemically bonding an ethylenically unsaturated carboxylic acid or anhydride thereof to an olefin-based polymer (via, for example, addition reaction or graft reaction). The olefin-based polymer used herein means polyolefin such as polyethylene (low pressure, medium pressure, high pressure), linear low-density polyethylene, polypropylene and polybutene, copolymers of olefin and a comonomer copolymerizable with the olefin (e.g. vinyl ester and unsaturated carboxylic acid ester) such as ethylene-vinyl acetate copolymers and ethylene-ethyl acrylate ester copolymers. Among these, linear low-density polyethylene, ethylene-vinyl acetate copolymers (having vinyl acetate content of 5 to 55% by weight), ethylene-ethyl acrylate ester copolymers (having an ethyl acrylate ester content of 8 to 35% by weight) are preferable. Especially, linear low-density polyethylene and ethylene-vinyl acetate copolymers are preferable. Examples of the ethylenically unsaturated carboxylic acid or anhydride thereof include ethylenically unsaturated monocarboxylic acid and its ester, ethylenically unsaturated dicarboxylic acid, its mono- or diester and its anhydride. Among these, anhydrides of ethylenically unsaturated dicarboxylic acids are preferable. Specific examples are maleic acid, fumaric acid, itaconic acid, maleic anhydride, itaconic anhydride, monomethyl maleate, monoethyl maleate, diethyl maleate and monomethyl fumarate. Above all, maleic anhydride is preferable.

The multilayer structure obtained in the manner mentioned above can be used as various types of molded articles such as packaging films and containers. Such molded articles can be employed suitably as packaging films and various types of food packaging containers such as deep-drawn containers, cup-shaped containers and bottles because of their good appearance, superior flexibility, controlled generation of odor and superior interlayer adhesiveness. In addition to food packaging containers, they can be used for applications including fuel containers, fuel pipes, hot water circulation pipes for floor heating and wallpaper.

A preferred application of the resin composition of the present invention is a blow molded container. As a method for blow molding, either extrusion blow molding or injection blow molding can be adopted. As an extrusion blow molding method, a method in which a previously-extruded pipe is cut, cooled, heated and then subjected to blow molding is available. However, preferred is a method in which an extruded tubular molten parison is blow molded directly, namely a so-called direct blow molding method. Examples of an injection molding method include a method in which a bottomed parison is injection molded first and the parison is blow molded while being still in a high temperature during the course of cooling and a method in which an injected bottomed parison is cooled, subsequently heated again and then blow molded. In the practice of such blow molding, when the blow molding was conventional long-run molding, resulting bottles sometimes suffered from hard spots, yellowing or streaks. In contrast, the use of the resin composition of the present invention can inhibit the occurrence of these defects. In particular, when the die temperature in extrusion blow molding or the nozzle temperature in injection blow molding is 250° C. or higher, those problems are likely to arise and therefore the use of the resin composition of the present invention will offer a great benefit under such conditions.

The blow molded container of the present invention may either consist of a single layer made of the resin composition of the present invention or comprise a multilayer structure having a layer of the resin composition and a layer of another thermoplastic resin. The resin composition is preferably fabricated into a multilayer structure because of its superior interlayer adhesiveness. Examples of the layer constitution of the multilayer structure include, but not limited to, E/T, T/E/T, E/Ad/T, T/Ad/E/Ad/T and T/E/T/E/T where the resin composition, an adhesive resin and another thermoplastic resin are represented by E, Ad and T, respectively. Each of the layers shown above may be a single layer or, in some cases, may include multiple layers. Regarding the thickness of each layer, the resin composition layers and the adhesive resin layers are approximately 5 to 300 μm thick each and the layers of another thermoplastic resin are approximately 20 to 5000 μm thick.

As a method for producing a blow molded container comprising such a multilayer structure, coextrusion blow molding and coinjection blow molding are suitably employed.

One desirable example of the coextrusion blow molding method is so-called direct blow molding which comprises using a multilayer extrusion molding machine having at least two extruders, charging the resin composition of the present invention, another thermoplastic resin and, if necessary, an adhesive resin into separate extruders, kneading and melt extruding them separately. Individual layers are extruded to be united firmly together inside a multilayer parison forming die or outside the die just after their discharging to obtain a tubular multilayer parison, and then blow molding the parison in a molten state to obtain a multilayer container. In the case where coextrusion blow molding, especially, direct blow molding is employed, the another thermoplastic resin is not particularly restricted but is preferably polyolefin. Of polyolefin, polyethylene and polypropylene are suitably employed. It is preferable that an adhesive resin layer be disposed between the layer of the resin composition of the present invention and the polyolefin layer. Preferable layer constitutions include E/Ad/T and T/Ad/E/Ad/T where the resin composition of the present invention, an adhesive resin and another thermoplastic resin (here, polyolefin) are represented by E, Ad and T, respectively.

As a method of coinjection blow molding, preferably employed is a method in which a multilayer parixon is obtained by injection molding using a multilayer injection molding machine having at least two screws and then the parison is blow molded while being cooled or the parison is cooled, subsequently heated again and then blow molded. When the multilayer parison is blow molded, the parison is preferably subjected to stretch blow molding, especially, biaxial stretch blow molding. In the case where coinjection blow molding is conducted, the another thermoplastic resin is not particularly restricted but is preferably polyester or polyamide. Especially, use of polyester typified by polyethylene terephthalate is preferable because a blow molded container superior in strength can be obtained by biaxial stretch blow molding.

In the coinjection blow molded container of the present invention, an adhesive resin layer may be disposed between the layer of the resin composition of the present invention and the layer of another thermoplastic resin. To the contrary, the layer of the resin composition of the present invention and the layer of another thermoplastic resin may also be contacted directly together. Preferable layer constitutions include T/E/T, T/Ad/E/Ad/T and T/E/T/E/T where the resin composition, an adhesive resin and another thermoplastic resin (here, polyester or the like) are represented by E, Ad and T, respectively. Above all, a constitution composed only of a layer of the resin composition and a layer of another thermoplastic resin is preferred. Preferable examples are layer constitutions T/E/T and T/E/T/E/T. In other words, layer constitutions where layers of another thermoplastic resin, especially polyethylene terephthalate, are disposed on both sides of a layer of the resin composition are preferred. Also in the case where no adhesive resin layer is disposed between a layer of the resin composition and a layer of another thermoplastic resin, the coinjection blow molded container of the present invention has a superior interlayer adhesiveness and therefore has a superior impact delamination resistance. It is possible to inhibit the layer of the resin composition and the adjacent layer of another thermoplastic resin to delaminate from each other even when the coinjection blow molded container receives an impact or the like.

Because the resin composition of the present invention is superior in secondary processability, it is preferable to subject a molded article obtained by melt molding to secondary processing. Examples of the secondary processing include a method of stretching a film or a sheet uniaxially or biaxially, a method of thermoforming a film or a sheet, or a method of rolling a film or a sheet. In addition, a parison obtained by coinjection molding may be subjected to blow molding. Particularly, it is preferable to use the resin composition for a multilayer film or for a thermoformed container, especially a deep-drawn container, obtained by secondary processing of a sheet. In particular, in the case of a deeply-drawn, complicatedly-shaped container, it is preferable to use a multilayer structure having a layer of the resin composition of the present invention which is superior in flexibility, secondary processability and interlayer adhesiveness.

Another preferable application of the resin composition of the present invention is a thermoformed container. The thermoforming used herein means an operation of forming a film or a sheet into the shape of a mold after softening it by heating. The forming method may be a method of forming a film or a sheet into the shape of a mold using vacuum or pressure and also optionally using a plug (e.g. straight forming, drape forming, air-slip forming, snapback forming and plug-assist forming) and a method of press molding. The forming conditions such as forming temperature, the degree of vacuum, the pressure for pressure forming and forming speed may be determined appropriately depending on the shape of a plug, the shape of a mold and the properties of a film or sheet to be formed. The thermoformed container, such as a cup or a tray, obtained by thermoforming in such a way can be suitably employed as various kinds of container, especially food packaging container.

EXAMPLES

The present invention will be described in more detail below with reference to Examples, but the invention is not limited to the Examples. Unless otherwise specifically indicated, "%" and "part" are all by weight. In all cases, ion exchange water was used as water.

(1) Quantitative Determination of Alkali Metal Salt (A) and Alkaline Earth Metal Salt (E)

Pellets of dry EVOH resin composition (F) were ground by freeze grinding. The resulting ground EVOH resin composition (F) was screened through a sieve having a nominal dimension of 1 mm (in accordance with Test Sieve Standard JIS Z 8801). Into a 100-mL Erlenmeyer flask with a ground stopper, 10 g of powder of the screened EVOH resin composition (F) and 50 mL of 0.01N aqueous HCl solution were placed. Then a cooling condenser was fitted to the flask and heat extraction were conducted under stirring at 95° C. for 10 hours. 2 mL of the resulting extraction solution was diluted with 8 mL of ion exchange water. The diluted extraction solution was quantitatively analyzed using an ion chromatography IC7000 manufactured by Yokogawa Electric Corporation. Thus, the amounts of Na ion, K ion, Mg ion and Ca ion were determined. For the quantitative determinations, calibration curves prepared by use of aqueous sodium chloride solution, aqueous potassium chloride solution, aqueous magnesium chloride solution and aqueous calcium chloride solution were used, respectively. Based on the thus-obtained amounts of Na ion, K ion, Mg ion and Ca ion, the amounts of alkali metal salts (A) and alkaline earth metal salts (E) contained in the pellets of dry EVOH were determined in terms of metal elements.

Ion Chromatography Measurement Conditions:
　Column: ICS-C25 manufactured by Yokogawa Electric Corporation.
　Eluant: Aqueous solution containing 5.0 mM of tartaric acid and 1.0 mM of 2,6-pyridinedicarboxylic acid.
　Measuring temperature: 40° C.
　Eluant flow rate: 1 mL/min
　Amount of sample injected: 50 $\mu$L (2) Quantitative Determination of Carboxylic Acid or its Salt (C)

Pellets of dry EVOH resin composition (F) were ground by freeze grinding. The resulting ground EVOH resin composition (F) was screened through a sieve having a nominal dimension of 1 mm (in accordance with Test Sieve Standard JIS Z 8801). Into a 100-mL Erlenmeyer flask with a ground stopper, 10 g of powder of the screened EVOH resin composition (F) and 50 mL of ion exchange water were placed. Then a cooling condenser was fitted to the flask and extraction were conducted under stirring at 95° C. for 10 hours. 2 mL of the resulting extraction solution was diluted with 8 mL of ion exchange water. The diluted extraction solution was quantitatively analyzed using an ion chromatography IC7000 manufactured by Yokogawa Electric Corporation, whereby the amount of carboxylate (acetate) ion was determined. Thus, the amount of carboxylate radical was obtained. For the quantitative determination, a calibration curve prepared by use of aqueous acetic acid solutions was used.

Ion Chromatography Measurement Conditions:
　Column: SCS5-252 manufactured by Yokogawa Electric Corporation.
　Eluant: 0.1% aqueous phosphoric acid solution
　Measuring temperature: 40° C.
　Eluant flow rate: 1 mL/min
　Amount of sample injected: 50 $\mu$L (3) Quantitative Determination of Phosphoric Acid Compound (D)

Pellets of dry EVOH resin composition (F) were ground by freeze grinding. The resulting ground EVOH resin composition (F) was screened through a sieve having a nominal dimension of 1 mm (in accordance with Test Sieve Standard JIS Z 8801). Into a 100-mL Erlenmeyer flask with a ground stopper, 10 g of powder of the screened EVOH resin composition (F) and 50 mL of 0.01 N aqueous HCl solution were placed. Then a cooling condenser was fitted to the flask and extraction were conducted under stirring at 95° C. for 4 hours. The resulting extraction solution was quantitatively analyzed using an ion chromatography IC7000 manufactured by Yokogawa Electric Corporation, whereby the amount of phosphate ion was determined. Thus, the amount of phosphate radical was obtained. For the quantitative determination, a calibration curve prepared by use of aqueous sodium dihydrogen phosphate solutions was used.

Ion Chromatography Measurement Conditions:
Column: ICS-A23 manufactured by Yokogawa Electric Corporation.
Eluant: Aqueous solution containing 2.5 mM of sodium carbonate and 1.0 mM of sodium hydrogencarbonate.
Measuring temperature: 40° C.
Amount of sample injected: 50 $\mu$L (4) Measurement of Degree of Saponification (NMR Method)

Dry EVOH pellets were ground by freeze milling. The resulting ground EVOH was screened through a sieve having a nominal dimension of 1 mm (in accordance with Test Sieve Standard JIS Z 8801). An operation cycle composed of immersing the sieved 5 g of EVOH powder in 100 g of ion exchange water, stirring at 85° C. for 4 hours, dewatering and drying was repeated twice. The resulting washed powdery EVOH was subjected to NMR measurement under the measurement conditions shown below. The degree of saponification was then determined by the analysis method provided below.

Measurement Conditions
Device: Superconducting nuclear magnetic resonance analyzer Lambda500 manufactured by JEOL
Observation frequency: 500 MHz
Solvent: DMSO-d6
Polymer concentration: 4% by weight
Measurement temperature: 40° C. and 95° C.
Accumulation: 600 times
Pulse delay time: 3.836 sec
Sample rotation speed: 10 to 12 Hz
Pulse width (90° pulse): 6.75 $\mu$sec Analysis Method In the measurement at 40° C., a peak of hydrogen in a water molecule appeared near 3.3 ppm. This peak overlapped a 3.1 to 3.7 ppm part of the peak of the methine hydrogen in the vinyl alcohol units of EVOH. On the other hand, in the measurement at 95° C., the overlapping occurred at 40° C. was eliminated, but a peak existing near 4 to 4.5 ppm of the hydrogens in the hydroxyl groups in vinyl alcohol units of EVOH overlapped a 3.7 to 4 ppm part of the peak of the methine hydrogen in vinyl alcohol units of EVOH. In the determination of the quantity of the methine hydrogens (3.1 to 4 ppm) in the vinyl alcohol units of EVOH, data measured at 95° C. were adopted for the region of 3.1 to 3.7 ppm and data measured at 40° C. were adopted for the region of 3.7 to 4 ppm for the purpose of avoidance of overlap with the peaks of the hydrogen of water or a hydroxyl group. Thus, the total amount of the methine hydrogens are determined as the sum of those data. It is known that the peak of hydrogen of water or a hydroxyl group shifts toward higher magnetic fields with increase in measurement temperature.

Therefore, analysis was done by use of both measurements at 40° C. and 95° C. in the following manner. An integral ($I_1$) of the peaks at a chemical shift of 3.7 to 4 ppm and an integral ($I_2$) of the peaks at a chemical shift of 0.6 to 1.8 ppm are determined from the spectrum measured at 40° C. An integral ($I_3$) of the peaks at a chemical shift of 3.1 to 3.7 ppm, an integral ($I_4$) of the peaks at a chemical shift of 0.6 to 1.8 ppm, and an integral ($I_5$) of the peaks at a chemical shift of 1.9 to 2.1 ppm are determined from the spectrum measured at 95° C. The peak of a chemical shift of 0.6 to 1.8 ppm derives mainly from methylene hydrogens, whereas the peak of a chemical shift of 1.9 to 2.1 ppm derives from methyl hydrogens in the units of unsaponified vinyl acetate. Based on these integral values, a degree of saponification was calculated according to the following formula:

$$\text{Degree of saponification} = \frac{(I_1/I_2 + I_3/I_4) \times 100}{(I_1/I_2 + I_3/I_4) + (I_5/I_4)/3}$$

(5) Measurement of Water Content of Hydrous EVOH Pellets

The water content of EVOH pellets were measured under conditions including a drying temperature of 180° C., a drying time of 20 minutes and a sample weight of about 10 g by means of a halogen moisture analyzer HR73 manufactured by METTLER.

(6) Measurement of Carbon Dioxide Gas Concentration

Using a portable pH and ion meter IM-22P manufactured by DKK-TOA Corp. connected to a carbon dioxide gas sensor (CE-2041), the carbon dioxide gas concentration in a solution was measured.

(7) Single-Layer Film Formation Test

Pellets of a dry EVOH resin composition (F) or of a resin composition comprising a dry EVOH resin composition (F) and an EVOH having a high degree of saponification were subjected to a single-layer film formation under the following conditions using a 20 mm extruder D2020 manufactured by Toyo Seiki Seisaku-Sho, Ltd. (D (mm)=20, L/D=20, compression ratio=2.0, screw: fullflight).

Condition 1: Film formation at 220° C.
Extrusion temperature:
C1/C2/C3/Die=175/200/220/220° C.
Screw rotation speed: 40 rpm
Discharge rate: 1.3 kg/hr
Drawing roll temperature: 80° C.
Drawing roll speed: 3.1 m/min
Film thickness: 20 $\mu$m Condition 2: Film formation at 250° C.
Extrusion temperature: C1/C2/C3/Die=175/230/250/250° C.
Screw rotation speed: 40 rpm
Discharge rate: 1.4 kg/hr
Drawing roll temperature: 80° C.
Drawing roll speed: 3.1 m/min
Film thickness: 20 $\mu$m (7-a) Yellowing Resistance Each of the single-layer films prepared in the method described above was wound up around a paper board tube and it was checked visually for the degree of yellowing at its edge according to the following criteria.

Rating: Criterion
A: No yellowing
B: A little yellowing
C: Yellowing (7-b) 48-Hour Long-Run Workability In the film formation at 220° C., a film passed for 48 hours since the beginning of the single-layer film formation was sampled and the number of gel-like hard spots having a visually recognizable size of about 100 $\mu$m or more was counted. The number of hard spots was converted into a number per 1.0 m$^2$ and was judged as follows.

Rating: Criterion
A: Less than 20 hard spots
B: Not less than 20 but less than 40 hard spots
C: Not less than 40 but less than 60 hard spots
D: 60 or more hard spots (7-C) 60-Hour Long-Run Workability In the film formation at 220° C., a film passed for 60 hours since the beginning of the single-layer film formation was sampled and the number of gel-like hard spots having a visually recognizable size of about 100 $\mu$m or more was counted. The number of hard spots was converted into a number per 1.0 m$^2$ and was judged as follows.

Rating: Criterion
 A: Less than 20 hard spots
 B: Not less than 20 but less than 40 hard spots
 C: Not less than 40 but less than 60 hard spots
 D: 60 or more hard spots (8) Evaluation of High-Temperature Yellowing A 2-mm thick disc-shaped sample was prepared by heat melting 5 g of pellets of a dry EVOH resin composition (F) or of a resin composition comprising a dry EVOH resin composition (F) and an EVOH having a high degree of saponification by use of a heat compression press machine at 250° C. for 2 minutes. The sample was visually evaluated for its hue.

Rating: Criterion
 A: Almost not yellowed.
 B: Slight yellowed.
 C: Yellowed.

(9) Adhesive Strength Test

Using pellets of a dry EVOH resin composition (F) or of a resin composition comprising a dry EVOH resin composition (F) and an EVOH having a high degree of saponification, a linear low density polyethylene (LLDPE; manufactured by Mitsui Chemicals, Inc., Ultzex 2022L), and an adhesive resin (Tie; Bondine TX8030 manufactured by Sumika Atochem Co., Ltd.), a three-kind 5-layer multilayer film (LLDPE/Tie/resin composition/Tie/LLDPE=50μ/10μ/10μ/10μ/50μ) was obtained in the method described below.

Specifications of the extruder and the T die used in this test are as follows:

Extruder:
 for resin composition: 20φ extruder for laboratory use ME CO-EXT (manufactured by Toyo Seiki Seisaku-Sho Ltd.)
 for Tie: 25φ extruder P25-18AC (manufactured by Osaka Seiki)
 for LLDPE: 32φ extruder GF-32-A (manufactured by Research Laboratory of Plastics Technology Co., Ltd.)

Extrusion temperature of resin composition:
 C1/C2/C3/die=175/210/220/220° C.

Tie extrusion temperature:
 C1/C2/C3/die=100/160/220/220° C.

LLDPE extrusion temperature:
 C1/C2/C3/die=150/200/210/220° C.

T die: 300 mm wide coat hunger die (manufactured by Research Laboratory of Plastics Technology Co., Ltd.)

(9-a) Adhesive Strength Just after Film Formation

The multilayer film obtained was cut into a size 150 mm along the MD and 10 mm along the TD just after the multilayer film formation and immediately was subjected to T type peel strength measurement by means of an Autograph (DCS-50M, manufactured by Shimadzu Corp.). In the measurement, the interlayer adhesive strength between the Tie located on the chill roll side and the resin composition in the multiplayer film was measured.

(9-b) Adhesive Strength After a Lapse of One Week Since the Film Formation

The above-prepared sample of a multilayer film 150 mm long and 10 mm wide was left stand for one week in a steady temperature and humidity room controlled at 23° C.-50% RH. In the constant temperature and humidity room controlled at 23° C.-50% RH, the T type peel strength measurement was carried out using the foregoing sample. In the measurement, the interlayer adhesive strength between the Tie located on the chill roll side and the resin composition in the multilayer film was measured.

(10) Odor Test 10 g of pellets of a dry EVOH resin composition (F) or of a resin composition comprising a dry EVOH resin composition (F) and an EVOH having a high degree of saponification and 10 mL of ion exchange water were put in a 100-mL glass vial, which was sealed with a lid. Then the vial was placed in a safe vent dryer (dryer) at 90° C. and heat extraction was conducted for 15 hours. Subsequently, the vial was left stand at room temperature for 30 minutes to be cooled. After the cooling, the lid of the vial was removed and the resulting extraction solution was evaluated for its odor by five monitors according to the following criteria.

Rating: Criterion
 A: No smell.
 B: Slight smell.
 C: Smell

Example 1

[Preparation and Evaluation of EVOH Resin Composition (F)]

As a saponification reactor, a bubble cap tower having a diameter of 0.85 m and twenty plates was employed. From the top of the bubble cap tower, a solution of an ethylene-vinyl alcohol copolymer (hereinafter referred to as EVAc) having an ethylene content of 51 mol % in methanol (EVAc concentration: 45% by weight) and a hydrous solution of sodium hydrogen in methanol (sodium hydroxide concentration: 15% by weight, water content: 5.8% by weight) were fed at rates of 1.3 t/hr and 50 kg/hr, respectively. The water content based on EVAc was about 5000 ppm. Moreover, methanol vapor at 115° C. was blown into the tower from the tower bottom at a rate of 1.1 t/hr and methyl acetate formed as a by-product was distilled off from the tower top together with part of the methanol. At this time, the temperature and pressure in the tower were 110 to 115° C. and 5.5 kg/cm$^2$ (about 0.54 MPa), respectively, and the residence time of the raw materials in the tower was about 30 minutes. In this way, solution of an EVOH having a degree of saponification of 96.0 mol % in methanol was obtained from the tower bottom.

Water-methanol mixed vapor was further blown to this solution and water-methanol mixed vapor was distilled off. Thus, an EVOH solution (EVOH cencentration: 36% by weight) in methanol-water mixed solvent (methanol/water=9/1, weight ratio) was obtained. This solution was discharged into a coagulation bath of methanol-water mixed solvent (methanol/water=10/90, weight ratio) at 5° C. through a die having a hole of 2 mm in diameter, thereby being solidified in strand form. This strand was cut with a cutter to yield pellets having a length of 2.5 to 3.5 mm.

An operation composed of charging 2.4 kg of the thus obtained hydrous pellets and 24 L of ion exchange water in a plastic container having a height of 400 mm and an opening diameter of 370 mm, washing at 25° C. for two hours while stirring, and then dewatering was repeated twice. Then, an operation composed of adding 24 L of a 1 g/L aqueous acetic acid solution to 2.4 kg of the hydrous pellets, washing at 25° C. for two hours while stirring and then dewatering was repeated twice. Moreover, an operation composed of adding 24 L of ion exchange water to 2.4 kg of the hydrous pellets, washing at 25° C. for two hours while stirring and then dewatering was repeated six times. The wash obtained after the sixth washing was measured for its conductivity using a CM-30ET manufactured by DKK-TOA Corporation. As a result, the wash had a conductivity of 3 μS/cm. The water content of the resulting EVOH pellets was 60% by weight.

Next, 12 L of ion exchange water was charged into a plastic container having a height of 400 mm and an opening diameter of 370 mm. A silicone tube (inner diameter: 7 mm; outer diameter: 10 mm) was inserted into the ion exchange water contained in the container and carbon dioxide gas was blown thereinto for 0.5 hour by bubbling at a rate of 1 L/min. The carbon dioxide gas was fed by use of a carbon dioxide gas cylinder (30 kg of liquefied carbon dioxide gas manufactured by Nippon Tansan Co., Ltd.) and a flow meter (Model RK-1600R manufactured by Kojima Instruments Inc.). In the water into which carbon dioxide gas had been blown, 3.24 g of potassium hydrogencarbonate and 1.32 g of potassium dihydrogenphosphate were dissolved and blowing of carbon dioxide gas was continued for another one hour at a rate of 1 L/min. The treatment solution had a potassium hydrogencarbonate content of 0.27 g/L and a potassium dihydrogenphosphate content of 0.11 g/L. The pH of the treatment solution after a 1-hour blowing of carbon dioxide gas was measured using a pH meter (MA235 manufactured by METTLER). The treatment solution had a pH of 5.3.

While the blowing of carbon dioxide gas at a blowing rate of 1 L/min was continued, 1.4 kg of the water-containing pellets were charged into the treatment solution and were subjected to immersion and stirring at 25° C. for four hours. During the period ranging from the beginning of the treatment to the end of the treatment, the pH of the treatment solution was measured at every one-hour interval. The pH of the treatment solution was kept at 5.3 at all measurements with no fluctuations. The carbon dioxide gas concentration in the treatment solution was analyzed to be 20 mmol/L. After a 4-hour immersion and stirring in the treatment solution, the resulting pellets were dewatered immediately and then were subjected to hot-air drying at 80° C. for 3 hours, then at 105° C. for 16 hours, yielding pellets of EVOH resin composition (F).

The alkali metal salt (A) contained in the resulting pellets of dry EVOH resin composition (F) was a potassium salt and the content of the alkali metal salt was 4.92 $\mu$mol/g in terms of metal element. Regarding alkaline earth metal salt (E), neither a magnesium salt nor calcium salt was detected and the content of alkaline earth metal salt (E) was 0 $\mu$mol/g in terms of metal elements. The content of carboxylic acid or its salt (C) was 0 $\mu$mol/g in terms of acetate radical. The content of the phosphoric acid compound (D) was 0.80 $\mu$mol/g in terms of phosphate radical. The MFR of the pellets of the dry EVOH resin composition (F) was 5.8 g/10 min (at 190° C. under a load of 2160 g).

Using the above-mentioned pellets of the dry EVOH resin composition (F), a single-layer film was prepared and then test of yellowing resistance and long-run workability were conducted in the procedures described previously. The yellowing resistance in the film formation at 220° C. of this example was evaluated as being A. The yellowing resistance in the film formation at 250° C. was evaluated as being A. The 48-hour long-run workability and 60-hour long-run workability were evaluated as being A and B, respectively.

Using the above-mentioned pellets of the dry EVOH resin composition (F), a high-temperature yellowing property test was conducted in the procedure described previously, resulting in an A rating. Moreover, using the above-mentioned pellets of the dry EVOH resin composition (F), an odor test was conducted in the procedure described previously. None of the five monitors perceived a smell and therefore an A rating was provided.

Furthermore, using the above-mentioned pellets of the dry EVOH resin composition (F), an adhesive strength test was conducted in the procedure described previously. The adhesive strength immediately after the film formation was 600 g/15 mm and that after a lapse of one week since the film formation was 900 g/15 mm. In both measurements, favorable adhesive strengths were obtained.

Comparative Example 1

Water-containing pellets after washing which were obtained in the same manner as Example 1 were immersed and stirred in 12 L of an aqueous solution containing 0.20 g/L of acetic acid and 0.07 g/L of potassium hydrogenphosphate at 25° C. for four hours. Thereafter the pellets were dewatered and then were subjected to hot-air drying at 80° C. for three hours and successively at 105° C. for 16 hours, yielding dry EVOH resin composition pellets.

The alkali metal salt (A) contained in the resulting dry EVOH resin composition pellets was potassium and the content of the alkali metal salt (A) was 0.57 $\mu$mol/g in terms of metal element. Regarding alkaline earth metal salt (E), neither a magnesium salt nor calcium salt was detected and the content of alkaline earth metal salt (E) was 0 $\mu$mol/g in terms of alkaline earth metal elements. The content of carboxylic acid or its salt (C) was 3.2 $\mu$mol/g in terms of acetate radical. The content of the phosphoric acid compound (D) was 0.40 $\mu$mol/g in terms of phosphate radical. The MFR of the dry EVOH resin composition pellets was 5.8 g/10 min (at 190° C. under a load of 2160 g).

Using the above-mentioned dry EVOH resin composition pellets, a single-layer film was prepared and then test of yellowing resistance and long-run workability were conducted in the procedures described previously. The yellowing resistance in the film formation at 220° C. of this comparative example was evaluated as being B. The yellowing resistance in the film formation at 250° C. was evaluated as being B. The 48-hour long-run workability and 60-hour long-run workability were evaluated as being A and B, respectively.

Using the above-mentioned dry EVOH resin composition pellets, a high-temperature yellowing property test was conducted in the procedure described previously, resulting in a B rating. Moreover, using the above-mentioned dry EVOH resin composition pellets, an odor test was conducted in the procedure described previously. All the five monitors perceived a smell and therefore a C rating was provided.

Furthermore, using the above-mentioned dry EVOH resin composition pellets, an adhesive strength test was conducted in the procedure described previously. The adhesive strength immediately after the film formation was 230 g/15 mm and that after a lapse of one week since the film formation was 650 g/15 mm.

Example 2

[Preparation and Evaluation of Resin Composition]

0.50 kg of pellets of the above-mentioned EVOH resin composition (F) obtained in Example 1 and 2.00 kg of an EVOH (degree of saponification: 99.9%) containing 3.4 $\mu$mol/g, in terms of potassium element in weight, of a potassium salt and 1.1 $\mu$mol/g, in terms of phosphate radical, of a phosphorus compound and having an ethylene content of 32 mol % were dry blended, and then melt kneaded and pelletized by means of a twin screw extruder (manufactured by Toyo Seiki Seisaku-Sho, Ltd.), thereby yielding a resin composition. Melt molding conditions are shown below. Specifications of the twin screw extruder (manufactured by Toyo Seiki Seisaku-Sho, Ltd.)

Type: twin screw extruder
    L/D: 25
    Aperture: 26 mm$\phi$
    Screw: co-rotational, completely engaging type
    Die hole number: 2 holes (3 mm$\phi$)
Kneading Conditions
    Rotation speed: 150 rpm Extrusion temperature:
C1/C2/C3/C4/C5/Die=180/200/220/220/220/220° C.
Discharge rate: 2.3 kg/hr Using the above-mentioned resin composition pellets obtained by melt kneading, a single-layer film was prepared and then test of yellowing resistance and long-run workability were conducted in the procedures described previously. The yellowing resistance in the film formation at 220° C. of this example was evaluated as being A. The yellowing resistance in the film formation at 250° C. was evaluated as being A. The 48-hour long-run workability and 60-hour long-run workability were evaluated as being A and B, respectively.

Using the above-mentioned resin composition pellets obtained by melt kneading, a high-temperature yellowing property test was conducted in the procedure described previously, resulting in an A rating. Moreover, using the above-mentioned resin composition pellets, an odor test was conducted in the procedure described previously. None of the five monitors perceived a smell and therefore an A rating was provided.

Furthermore, using the above-mentioned resin composition pellets obtained by melt kneading, an adhesive strength test was conducted in the procedure described previously. The adhesive strength immediately after the film formation was 623 g/15 mm and that after a lapse of one week since the film formation was 751 g/15 mm. In both measurements, favorable adhesive strengths were obtained.

Comparative Example 2

In a manner similar to Example 2, 0.50 kg of pellets of the dry EVOH resin composition obtained in Comparative Example 1 and 2.00 kg of an EVOH (degree of saponification: 99.9%) containing 3.4 μmol/g, in terms of potassium element in weight, of a potassium salt and 1.1 μmol/g, in terms of phosphate radical, of a phosphorus compound and having an ethylene content of 32 mol % were dry blended, and then melt kneaded and pelletized.

Using the above-mentioned resin composition pellets obtained by melt kneading, a single-layer film was prepared and then test of yellowing resistance and long-run workability were conducted in the procedures described previously. The yellowing resistance in the film formation at 220° C. of this comparative example was evaluated as being A. The yellowing resistance in the film formation at 250° C. was evaluated as being B. The 48-hour long-run workability and 60-hour long-run workability were evaluated as being A and B, respectively.

Using the above-mentioned resin composition pellets obtained by melt kneading, a high-temperature yellowing property test was conducted in the procedure described previously, resulting in an A rating. Moreover, using the above-mentioned resin composition pellets, an odor test was conducted in the procedure described previously. Three of the five monitors perceived a smell and therefore a B rating was provided.

Furthermore, using the above-mentioned resin composition pellets obtained by melt kneading, an adhesive strength test was conducted in the procedure described previously. The adhesive strength immediately after the film formation was 560 g/15 mm and that after a lapse of one week since the film formation was 716 g/15 mm.

Example 3

Using a constitution including the pellets obtained in Example 2 as a resin composition layer, a linear low density polyethylene (LLDPE) resin ("ULTZEX 3520L" manufactured by Mitsui Chemicals, Inc.) as both outermost layers and "ADMER SF600" manufactured by Mitsui Chemicals, Inc. as an adhesive (AD) layer, a three-kind five-layer film for thermoforming (LLDPE/AD/resin composition/AD/LLDPE=40μ/5μ/20μ/5μ/40μ) having a total thickness of 110 μm was obtained by means of a co-extruder having a T-die.

Coextrusion molding conditions are as follows.
Extruder:
for resin composition: 20φ extruder for laboratory use ME CO-EXT (manufactured by Toyo Seiki Seisaku-Sho Ltd.)
for AD: 25φ extruder P25-18AC (manufactured by Osaka Seiki)
for LLDPE: 32φ extruder GF-32-A (manufactured by Research Laboratory of Plastics Technology Co., Ltd.)
Extrusion temperature of resin composition:
C1/C2/C3/die=175/210/220/220° C.
Extrusion temperature of AD:
C1/C2/C3/die=100/160/220/220° C.
LLDPE extrusion temperature:
C1/C2/C3/die=150/200/210/220° C.
T die: 300 mm wide coat hunger die (manufactured by Research Laboratory of Plastics Technology Co., Ltd.)

A thermoformed container was obtained by thermoforming the multilayer film obtained above using a thermoforming machine (R530 manufactured by Multivac Inc.). The multilayer film was heated at a mold temperature of 100° C. for two seconds and then was molded into the shape of a mold (a rectangular prism shape 130 mm long, 110 mm wide and 60 cm deep) by using compressed air (pressure: 5 kgf/cm$^2$) to afford a thermoformed container. The appearance of the resulting thermoformed container was visually observed. As a result, uniform drawing was achieved without causing unevenness or local variation in thickness and the container had a good appearance.

Example 4

Using a constitution including the pellets obtained in Example 2 as a resin composition layer, a linear low density polyethylene (LLDPE) resin ("MIRASON 102" manufactured by Mitsui Chemicals, Inc.) as both outermost layers and "Bondine TX8030" manufactured by Sumitomo Chemical Co., Ltd. as an adhesive (AD) layer, a five-layer coextrusion direct blow molded container was produced. Molding conditions are as follows.

Molding machine: Four-kind seven-layer direct blow molding machine manufactured by Suzuki Tekkosho Co.
Resin composition extrusion temperature: 210° C.
Low-density polyethylene extrusion temperature: 195° C.
Adhesive resin extrusion temperature: 195° C.
Mold temperature: 15° C.
Bottle capacity: 1000 ml
Layer constitution: LLDPE/AD/resin composition/AD/LLDPE=340/20/40/20/340 (μm)

The above-obtained blow molded container was visually observed. As a result, it was free from interlayer delamination, haze, streaks, air bubbles and gel-like matters and had a good appearance.

Example 5

Using the resin composition pellets obtained in Example 2 and a polyethylene terephthalate (PET) manufactured by VORIDIAN "PET 9921W", coinjection molding was carried out continuously for 24 hours by means of a coinjection molding machine (model SL160, four-cavity) manufactured by KORTEC/HUSKY. Thus, two-kind three-layer PET/resin composition/PET bottomed parisons were molded. In the molding, the temperature of the injection machine for PET was set at 280° C. The temperature of the injection machine for the resin composition was set at 210° C. The temperature of the hot runner block where PET and the resin composition met together was set at 270° C. The core temperature of the injection mold was set at 10° C. The cavity temperature of the injection mold was set at 10° C. The injection rate and the injection amount were adjusted so that the thickness ratio of the PES layers to the resin composition layer in a container became 95/5. The resulting parison was visually observed and neither yellowing nor streaks were recognized.

Then, using a stretch blow molding machine (model LB01, one 530-mL cavity) manufactured by CRUPP CORPOPLAST MASCHINENBAU, a bottomed parison obtained just after the 24-hour continuous molding was heated to a surface temperature of 105° C. and then was stretch blow molded. Thus, a two-kind three-layer coinjection stretch blow molded container was obtained. The thickness constitution of the container was (inside) PET/resin composition/PET (outside)=140/25/180 ($\mu$m). The above-obtained container was visually observed. As a result, it was free from interlayer delamination, haze or hard spots. Moreover, neither yellowing nor streaks were recognized.

What is claimed is:

1. A method for producing an ethylene-vinyl alcohol copolymer resin composition (F), wherein an ethylene-vinyl alcohol copolymer resin having an ethylene content of 5 to 60 mol % and a degree of saponification of 80 to 99 mol % is contacted with an aqueous solution containing an alkali metal salt (A) and carbon dioxide gas.

2. The method for producing an ethylene-vinyl alcohol copolymer resin composition (F) according to claim 1, wherein the ethylene content of the ethylene-vinyl alcohol copolymer is 47 to 60 mol %.

3. A method for producing a molded article, wherein an ethylene-vinyl alcohol copolymer resin composition (F) produced by the method according to claim 1 is melt molded.

4. A method for producing a film, wherein an ethylene-vinyl alcohol copolymer resin composition (F) produced by the method according to claim 1 is melt molded.

5. A method for producing a blow molded container, wherein an ethylene-vinyl alcohol copolymer resin composition (F) produced by the method according to claim 1 is used.

6. A method for producing a thermoformed container, wherein an ethylene-vinyl alcohol copolymer resin composition (F) produced by the method according to claim 1 is used.

7. A method for producing a multilayer structure, wherein an ethylene-vinyl alcohol copolymer resin composition (F) produced by the method according to claim 1 is laminated with a thermoplastic resin.

8. A method for producing a resin composition, wherein an ethylene-vinyl alcohol copolymer resin having an ethylene content of 5 to 60 mol % and a degree of saponification of 80 to 99 mol % is contacted with an aqueous solution containing an alkali metal salt (A) and carbon dioxide gas and then is melt kneaded with another thermoplastic resin (G).

9. The method for producing a resin composition according to claim 8, wherein the thermoplastic resin (G) is an ethylene-vinyl alcohol copolymer having an ethylene content of 5 to 60 mol % and a degree of saponification of 99.2 to 100 mol %.

10. A method for producing a molded article, wherein a resin composition produced by the method according to claim 8 is melt molded.

11. A method for producing a film, wherein a resin composition produced by the method according to claim 8 is melt molded.

12. A method for producing a blow molded container, wherein a resin composition produced by the method according to claim 8 is used.

13. A method for producing a thermoformed container, wherein a resin composition produced by the method according to claim 8 is used.

14. A method for producing a multilayer structure, wherein a resin composition produced by the method according to claim 8 is laminated with a thermoplastic resin.

* * * * *